United States Patent Office 2,834,781
Patented May 13, 1958

2,834,781

HYDRAZIDES AND METHOD OF PREPARATION

Peter S. Petrie and Lee H. Horsley, Midland, Mich., assignors to The Dow Chemical Company, Midland, Mich., a corporation of Delaware No Drawing. Application October 3, 1956
Serial No. 613,617

11 Claims. (Cl. 260—268)

This invention concerns pyrrolidine-, piperidine- and piperazine-alkanoic acid hydrazides and their method of preparation.

Hydrazides of alkanoic acids and their method of preparation are known.

In accordance with this invention, it has now been discovered that the new compounds 1-pyrrolidine-, 1-piperidine- and 1-piperazine-alkanoic acid hydrazides, including the phenylhydrazides, can be made by heating at least a stoichiometric equivalent of a lower alkyl alkanoate of the group consisting of alkyl 1-pyrrolidinealkanoates, alkyl 1-piperidinealkanoates, alkyl 1-piperazinealkanoates and alkyl 1,4-piperazinebis-(alkanoates) with a hydrazine such as hydrazine or phenylhydrazine to form the corresponding hydrazide. By "lower alkyl" is meant one through four carbon alkyl groups. An inert solvent medium such as methanol, ethanol, propanol, isopropanol or a mixture thereof is advantageously used. Ethanol is the preferred inert solvent medium. The reaction is usually carried out under anhydrous or substantially anhydrous conditions, e. g., alcohol of commerce containing about 5 percent of water can be used. A reaction temperature ranging between 5° C. and reflux, preferably between 20° C. and reflux, is advantageous. The reaction time varies with the reactants and ranges between 1 and 70 hours. Elevated pressures, especially with the lower boiling solvents, may be used to increase reaction temperature and thereby decrease reaction time.

Representative compounds of this invention have been found to be of particular value as active toxic constituents of disinfectant fungicidal and germicidal compositions for the control of *Erwinia carotovora*, *Salmonella typhosa*, *Aspergillius terreus*, *Rhizopus nigricans* and *Alternaria solani*.

The following examples represent specific embodiments of this invention.

Example 1

A quantity of 16 g. (0.1 mole) of methyl 1-pyrrolidienepropionate, 5 g. (0.1 mole) of hydrazine hydrate and 10 ml. of ethanol as solvent was mixed and heated at 80° C. for one hour. The solvent was then removed under reduced pressure. The residual material solidified on cooling to give 1-pyrrolidinepropionic acid hydrazide having a purity of 94 percent in a yield of 95 percent. It was recrystallized from toluene to give a product having a melting point of 46–47° C. and a purity of 97 percent, as determined by the basicity analysis method (titration in aqueous solution with hydrochloric acid). The methyl 1-pyrrolidinepropionate reactant was made by condensing pyrrolidine with methyl β-chloropropionate.

Example 2

A quantity of 80 g. (0.4 mole) of ethyl 2,6-dimethyl-1-piperidine-acetate (prepared by condensing 2,6-dimethyl piperidine with ethyl chloroacetate), 40 g. (0.8 mole) of hydrazine hydrate and 80 ml. of ethanol as solvent was heated at 85–90° C. for 60 hours. The product was crystallized from ethanol. There was obtained 57 g. (0.31 mole) of 2,6-dimethyl-1-piperidineacetic acid hydrazide as a crystalline solid, melting at 66–68° C.

Example 3

A quantity of 86 g. (0.5 mole) of ethyl 1-piperazineacetate (prepared by condensing equimolar proportions of ethyl chloroacetate and piperazine), 25 g. (0.5 mole) of hydrazine hydrate and 50 ml. of ethanol as solvent was heated together for 20 hours at 75–85° C. There was obtained 78 g. (0.49 mole) of 1-piperazineacetic acid hydrazide as a solid, melting at 60–65° C.

Example 4

A quantity of 0.2 g. mole of diethyl 1,4-piperazinediacetate (prepared by condensing 1 mole of piperazine with 2 moles of ethyl chloroacetate) and 0.4 g. mole of phenylhydrazine was heated together at 85° C. for 72 hours, then at 140–145° C. for 5 hours. The reaction product was filtered, washed on the filter with methanol, and dried at room temperature. A pale tan powder, melting at 243–245° C., identified as 1,4-piperazine-bis-(acetic acid phenylhydrazide) by the basicity analysis method, was obtained.

Example 5

A quantity of 93 g. (0.5 mole) of methyl α-ethyl-1-piperidineacetate (prepared by condensing piperidine with methyl 2-chlorobutyrate) and 54 g. (0.5 mole) of phenylhydrazine was heated together for 72 hours at 85° C. then at 175–180° C. for 6 hours to give a viscous product identified as α-ethyl-1-piperidineacetic acid phenylhydrazide.

For the control of fungal organisms and bacteria, compounds of this invention may be dispersed on finely divided inert carriers and employed as dusts. They may also be employed in oils, in water, as constituents of aqueous emulsions or in aqueous dispersions. In a representative operation, a dispersion of 333 p. p. m. of 1-pyrrolidinepropionic acid hydrazide in water when used as a spray inhibited the growth of *Alternaria solani* (tomato early blight) in a test wherein treated and untreated tomato plants were inoculated with spores thereof.

What is claimed is:

1. A member of the group consisting of 1-pyrrolidinealkanoic acid hydrazides, 1-piperidinealkanoic acid hydrazides, 1-piperazinealkanoic acid hydrazides, 1,4-piperazinebis-(alkanoic acid hydrazides) and their lower alkyl ring-substituted homologs and analogs, the alkanoic moiety having up to 4 carbon atoms.
2. 1-pyrrolidinealkanoic acid hydrazide, the alkanoic moiety having up to 4 carbon atoms.
3. 1-piperidinealkanoic acid hydrazide, the alkanoic moiety having up to 4 carbon atoms.
4. 1-piperazinealkanoic acid hydrazide, the alkanoic moiety having up to 4 carbon atoms.
5. 1,4-piperazinebis-(alkanoic acid hydrazide) the alkanoic moiety having up to 4 carbon atoms.
6. 1-pyrrolidinepropionic acid hydrazide.
7. 2,6-dimethyl-1-piperidineacetic acid hydrazide.
8. 1-piperazineacetic acid hydrazide.
9. 1,4-piperazinebis-(acetic acid phenylhydrazide).
10. α-Ethyl-1-piperidineacetic acid phenylhydrazide.
11. A process of making hydrazides which comprises heating a member of the group consisting of alkyl 1-pyrrolidinealkanoates, alkyl 1-piperidinealkanoates, alkyl 1-piperazinealkanoates, and alkyl 1,4-piperazinebis-(alkanoates) with at least a stoichiometric equivalent of a hydrazine at a reaction temperature between 5° C. and reflux temperature in the presence of an inert solvent, said alkyl group having no more than 4 carbon atoms, for a time sufficient to form the corresponding hydrazide, the alkanoic moiety having up to 4 carbon atoms.

No references cited.